(No Model.)
W. N. PARRISH.
WIRE LOOPING TOOL.
No. 595,729. Patented Dec. 21, 1897.
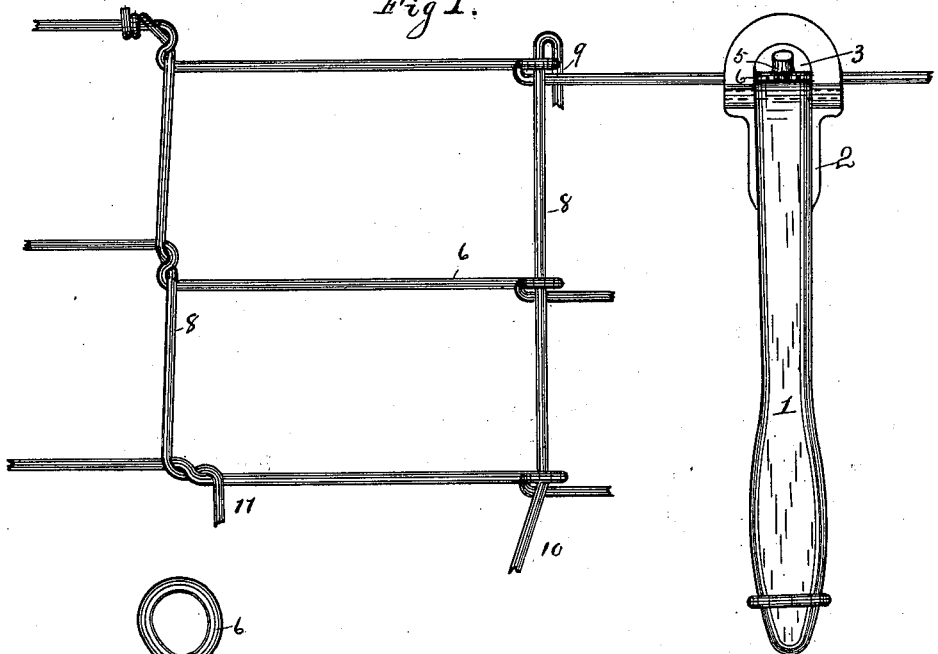
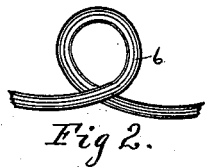
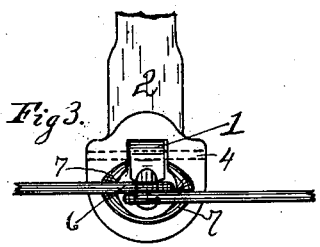
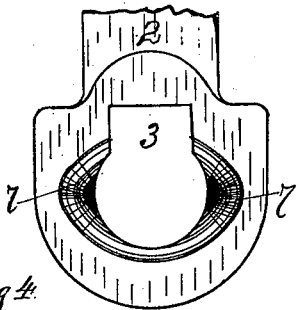
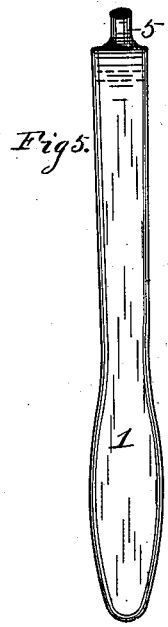
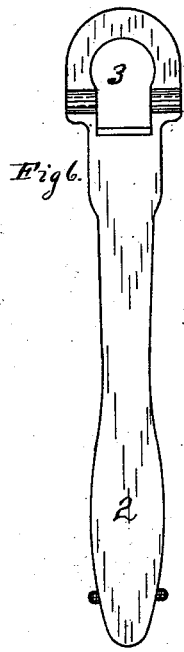
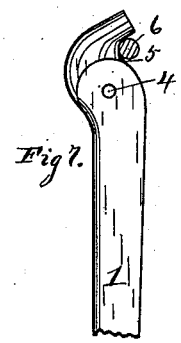
WITNESSES:
INVENTOR:
W. N. Parrish
By ATTORNEY.

UNITED STATES PATENT OFFICE.

WILLIAM N. PARRISH, OF RICHMOND, INDIANA.

WIRE-LOOPING TOOL.

SPECIFICATION forming part of Letters Patent No. 595,729, dated December 21, 1897.

Application filed June 12, 1897. Serial No. 640,446. (No model.)

*To all whom it may concern:*

Be it known that I, WILLIAM N. PARRISH, a citizen of the United States, residing at Richmond, in the county of Wayne and State of Indiana, have invented certain new and useful Improvements in Tools for Looping and Locking Wires for Wire Fences; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in wire-fence machines, and has specific reference to an improved tool or implement for looping and locking the wires of fences.

The object of the invention is to provide a cheap and handy tool for applying the stay-wires to the line-wires of the fence and which is equally useful in the construction of an entirely new fence or in applying said stay-wires to an old wire fence. Throughout the country there is a great deal of barbed and other wire fencing that was constructed during a more or less remote period before the art of wire-fence making had reached its present perfected state and which has become slackened or loosened to such an extent that it is practically useless as a fence. To strengthen, tighten, and reclaim such fencing and thereby avoid the necessity of replacing it with entirely new fencing is the prime object of this invention. The implement is hand-operative and can be readily manipulated to the end that an old fence of barbed or other wire may be put into a useful condition.

In a detailed description reference is made to the accompanying drawings, of which—

Figure 1 is an elevation of a small portion of a wire fence with my improved tool in a position to be turned to form a loop in the uppermost line-wire. Fig. 2 is a plan view of a loop as formed by the implement. Fig. 3 is a view of the side of the implement opposite that shown in Fig. 1, in which the line-wire is caught. Fig. 4 is an enlarged view of one of the members shown in Fig. 3 with the other member and the wire removed. Figs. 5 and 6 are views of the two members separated. Fig. 7 is a side elevation of the wire-engaging end of the member shown in Fig. 5.

In the several views the same reference-characters indicate similar parts.

The implement consists of two members 1 and 2, the former of which is mounted in an opening 3 in the latter by means of a fulcrum-pin 4. The end of the part 1, that is thus inclosed in the opening 3, is essentially rounded in cross-section and terminates in a reduced diameter as compared with that portion thereof that receives the fulcrum-pin. The extreme end of said member is also essentially curved, so as to provide a hook or recessed portion 5 for the line-wires 6 to enter when said line-wires are gripped, as shown in Figs. 1 and 3. Member 2 of said implement has its wire-engaging end enlarged and flattened to an extent that permits of the opening 3 being formed therein for the reception of the engaging end of member 1. The outer side of this enlarged end of member 2 is recessed or beveled outwardly, as at 7, from the edge of the opening to provide an easy bearing for the line-wire on each side of the portion that is gripped by the curved end of member 1. This recessed or beveled side of the implement, it will be seen in Figs. 3 and 4, extends or increases transversely in the direction that the wire lies. This feature of the invention is essential, as is also the form of the engaging end of member 1, as it is important for reasons that are obvious that no sharp or abrupt edges of the implement be brought in contact with the wire when the latter is gripped.

In manipulating the tool the members 1 and 2 are opened for the reception of the line-wire, as shown in Figs. 1 and 7. Said members are then closed by the hands, similar to the manner of closing a pair of nippers. This operation of closing said members draws the engaged portion of the wire into the opening 3 and forms a gradual curve or bend therein, the wire on each side of the engaging end of member 1 being held against the recessed side 7 7 of the member 2. The loop or eye, as shown in Fig. 2, is but partly formed in this operation of the implement. To complete the eye or loop, the said implement is turned laterally and upwardly to the right in a half-circle from the position shown in Fig. 1. On the completion of this movement the handle of said implement would be in an upper position, diametrically opposite to its position in Fig. 1, or in the position as shown in Fig. 3. It will be borne in mind, however, that the side of the implement as shown in Fig. 3 is opposite to that shown in Fig. 1. The implement is then detached from the loop thus formed by opening the members, and the operation is repeated until similar loops are formed in all of the line-wires, all of said loops being in a vertical line. A stay-wire 8 is then dropped into said loops, as shown, being first provided with a bend or hook 9 at its upper end to prevent it from leaving or passing entirely through said loops. After the stay-wire has been thus inserted in said loops a series of loops are formed in advance thereof. In the operation of completing said loops by giving the implement a half-turn, as hereinbefore specified, the draft on each of the line-wires, incidental to the formation of said loops, closes or pulls on the loops previously formed and in which a stay has been previously placed. This draft on said line-wires is transferred to the portions of the stay-wire inclosed in said loops. The result is the said stay-wire and line-wires become firmly locked together, as shown on the extreme left in Fig. 1. The vertical stay-wire 8 adjacent to the implement, as shown in Fig. 1, has not yet received this draft. In placing said stay-wires in the loops preparatory to receiving said draft the lower end of said stay-wire is bent slightly to the left, as shown at 10. In locking said wires the said lower end of the stay-wire will assume the position shown at 11.

Having fully described my invention, I claim—

1. An implement for looping and locking the wires of wire fences, comprising two pivotally-united members, one of which has an engaging end rounded and terminated in a bend or hook adapted to receive a wire, and the other of said members having an engaging end provided with an opening into which said wire may be drawn, and a recessed or beveled side against which the wire is held, substantially as shown and described.

2. In an implement for the attachment of the horizontal and vertical wires of a fence, a member having an enlarged end provided with an opening therein the edges of which on one side of said member are beveled outwardly, in combination with a second member fulcrumed thereon and having an engaging end rounded and terminating in a curve adapting it to engage a wire, the said engaging end being inclosed in the opening in the first-mentioned member, substantially as and for the purpose specified.

In testimony whereof I affix my signature in presence of two witnesses.

WILLIAM N. PARRISH.

Witnesses:
R. J. McCARTY,
A. M. GARDNER.